(12) United States Patent
Schraeder et al.

(10) Patent No.: US 9,283,645 B2
(45) Date of Patent: Mar. 15, 2016

(54) CENTERING DEVICE FOR CENTERING A CHUCK ON A ROTATING SPINDLE AND ASSOCIATED LOCKING DEVICE

(75) Inventors: Philipp Schraeder, Mengen (DE); Alexander Holstein, Heiligkreuztal (DE)

(73) Assignee: SCHUNK GMBH & CO. KG SPANN-UND GREIFTECHNIK, Lauffen am Neckar (DE)

( * ) Notice: Subject to any disclaimer, the term of this patent is extended or adjusted under 35 U.S.C. 154(b) by 703 days.

(21) Appl. No.: 13/638,650

(22) PCT Filed: Mar. 16, 2011

(86) PCT No.: PCT/EP2011/054000
§ 371 (c)(1),
(2), (4) Date: Dec. 18, 2012

(87) PCT Pub. No.: WO2011/120811
PCT Pub. Date: Oct. 6, 2011

(65) Prior Publication Data
US 2013/0093148 A1 Apr. 18, 2013

(30) Foreign Application Priority Data

Apr. 1, 2010 (DE) .................. 20 2010 014 139 U
Sep. 20, 2010 (DE) .................. 10 2010 041 054

(51) Int. Cl.
*B23Q 3/18* (2006.01)
*B23B 31/163* (2006.01)
(Continued)

(52) U.S. Cl.
CPC ............ *B23Q 3/12* (2013.01); *B23B 31/16004* (2013.01); *B23B 31/36* (2013.01);
(Continued)

(58) Field of Classification Search
CPC B23B 31/16004; B23B 31/201; B23B 31/36; B23Q 3/12; B23Q 3/183

USPC .......... 279/2.02, 2.03, 71–73, 110, 114–116, 279/133, 141
See application file for complete search history.

(56) References Cited

U.S. PATENT DOCUMENTS 1,108,514 A * 8/1914 Koontz .................. 408/176
1,766,276 A * 6/1930 Berg .................... 279/115
(Continued)

FOREIGN PATENT DOCUMENTS

| CN | 1426868 A | 7/2003 |
| CN | 1157275 C | 7/2004 |

(Continued)

OTHER PUBLICATIONS

English translation of Notice of Reasons for Rejection for Japanese Patent Application No. 2013-501735 dated Jul. 9, 2014 (5 pages).
(Continued)

*Primary Examiner* — Eric A Gates
(74) *Attorney, Agent, or Firm* — Michael Best & Friedrich LLP

(57) ABSTRACT

The invention concerns a centring device for centring a chuck on a securing portion in particular of a rotating spindle of a machine, wherein a tapered portion corresponding to a mating tapered portion on the chuck side is provided on the securing portion in such a way that the tapered portion and/or the mating tapered portion is/are formed so as to yield elastically in the axial direction such that, after the tapered portion comes into contact with the mating tapered portion, the chuck can be moved further in the axial direction, at least to a limited extent, as a result of an axial pulling-in force until the chuck comes to lie against a stop on the securing portion side. The invention likewise concerns an associated locking device.

20 Claims, 6 Drawing Sheets

(51) Int. Cl.
*B23Q 3/12* (2006.01)
*B23B 31/36* (2006.01)

(52) U.S. Cl.
CPC ........ *B23Q 3/183* (2013.01); *Y10T 279/17717* (2015.01); *Y10T 279/26* (2015.01); *Y10T 279/33* (2015.01); *Y10T 279/34* (2015.01)

(56) References Cited

U.S. PATENT DOCUMENTS

| | | | | |
|---|---|---|---|---|
| 2,475,861 | A | * | 7/1949 | Thalmann .................. 279/71 |
| 2,723,861 | A | | 11/1955 | Eisler |
| 3,682,491 | A | * | 8/1972 | Sakazaki et al. ............ 279/124 |
| 3,874,688 | A | * | 4/1975 | Schiller ..................... 279/50 |
| 4,688,810 | A | | 8/1987 | Waite |
| 4,833,955 | A | | 5/1989 | Oki et al. |
| 5,186,476 | A | * | 2/1993 | Heel et al. .................. 279/2.03 |
| 5,340,130 | A | * | 8/1994 | Gorse ....................... 279/110 |
| 5,964,556 | A | | 10/1999 | Toyomoto |
| 6,220,608 | B1 | * | 4/2001 | Varnau ...................... 279/114 |
| 6,599,068 | B1 | * | 7/2003 | Miyazawa .................. 409/234 |
| 7,284,938 | B1 | * | 10/2007 | Miyazawa .................. 409/231 |
| 7,584,971 | B2 | * | 9/2009 | Weller ....................... 279/93 |
| 7,938,408 | B2 | * | 5/2011 | Haimer ...................... 279/102 |
| 8,132,816 | B2 | * | 3/2012 | Norton et al. .............. 279/2.19 |
| 8,209,840 | B2 | * | 7/2012 | Norton ....................... 29/428 |
| 2005/0013675 | A1 | | 1/2005 | Bengston et al. |

FOREIGN PATENT DOCUMENTS

| | | | |
|---|---|---|---|
| CN | 1586776 | A | 3/2005 |
| CN | 100344407 | C | 10/2007 |
| CN | 101267905 | A | 9/2008 |
| CN | 101502886 | A | 8/2009 |
| CN | 101633125 | A | 1/2010 |
| DE | 724892 | C | 9/1942 |
| DE | 4302655 | A1 | 9/1993 |
| DE | 10032073 | A1 | 3/2003 |
| EP | 0244667 | A2 | 11/1987 |
| EP | 272394 | A1 * | 6/1988 ............. B23B 31/28 |
| EP | 0339282 | A2 | 11/1989 |
| EP | 1275468 | A1 | 1/2003 |
| EP | 1295675 | A1 | 3/2003 |
| JP | 63074508 | | 5/1988 |
| JP | 03019608 | | 1/1991 |
| JP | 0639339 | | 2/1994 |
| JP | 10071512 | | 3/1998 |
| WO | 94/23871 | A1 | 10/1994 |
| WO | 0176814 | | 10/2001 |
| WO | 0176815 | | 10/2001 |

OTHER PUBLICATIONS

International Search Report for Application No. PCT/EP2011/053997 dated Sep. 5, 2011 (3 pages).
International Search Report for Application No. PCT/EP2011/054000 dated Sep. 5, 2011 (3 pages).
Notification of the First Office Action from State Intellectual Property Office of People's Republic of China received in Chinese Patent Application No. 201180017868.7, mailed May 30, 2014.

* cited by examiner

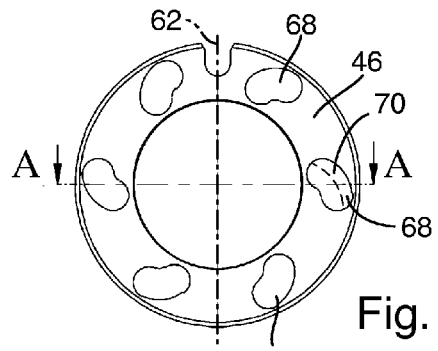
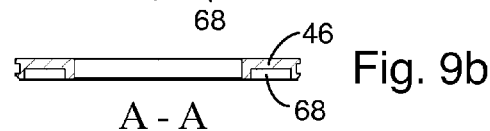
Fig. 9a
Fig. 9b
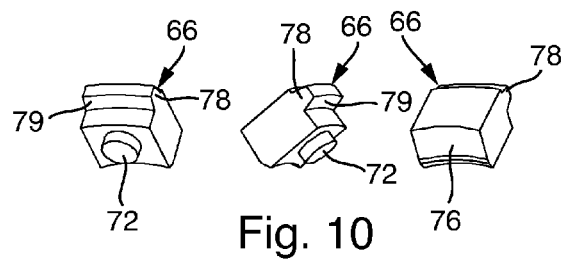
Fig. 10
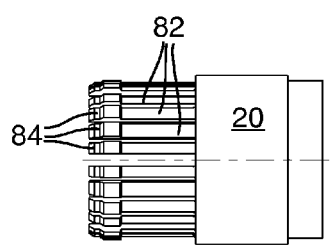
Fig. 11a
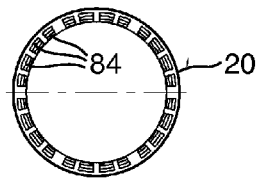
Fig. 11b
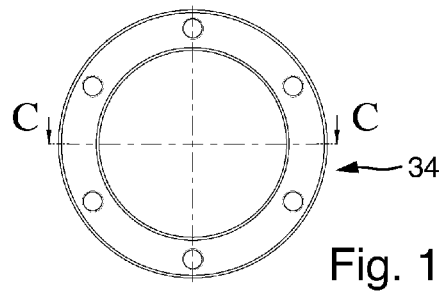
Fig. 12a
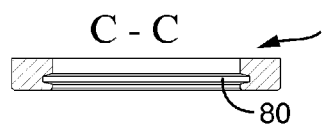
Fig. 12b

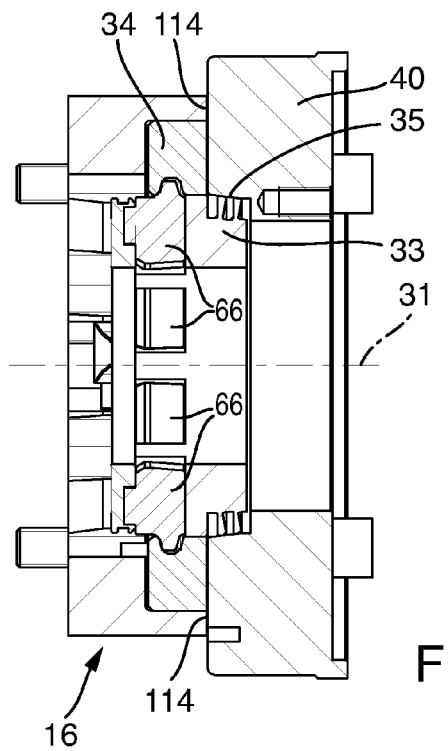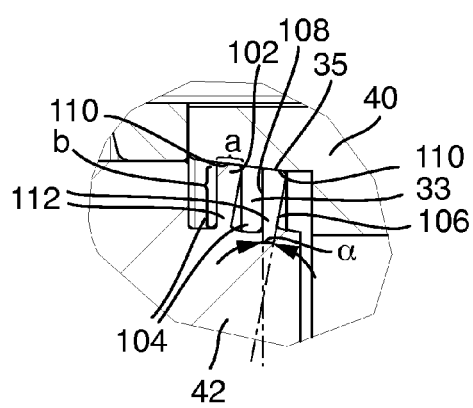
Fig. 13a  Fig. 13b
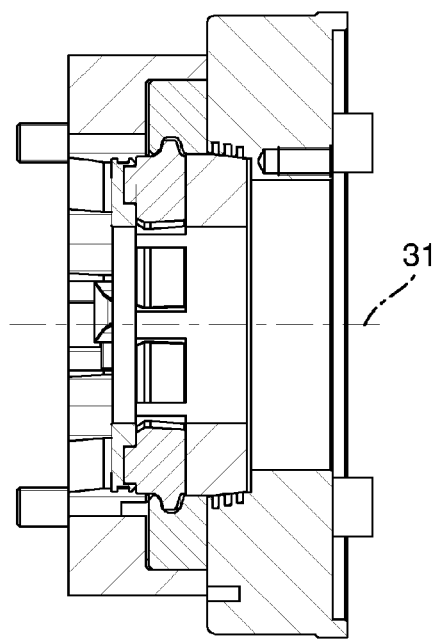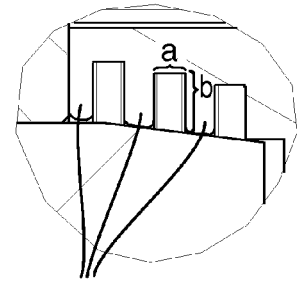
Fig. 14a  Fig. 14b

CENTERING DEVICE FOR CENTERING A CHUCK ON A ROTATING SPINDLE AND ASSOCIATED LOCKING DEVICE

The invention relates to a centering device for centering a chuck on a securing portion particularly of a rotating spindle of a machine. The invention relates, moreover, to an associated locking device.

Work pieces are often clamped in chucks. Depending on the type of work piece, it may be necessary to provide different, exchangeable chucks. A centering device for centering the chuck on a securing portion particularly of a rotating spindle will be proposed by the invention, said centering device making it possible to have reliable centering and to have a defined bearing of the chuck on the rotating spindle.

Known centering devices include, for example, cones and associated countercones. The provision of cones and countercones has the disadvantage, however, that, when the faces of the cone bear against the faces of the countercone, exact alignment of the conical portion of the chuck is necessary to achieve a planar bearing of the chuck against a particularly spindle-side stop. Exact alignment is difficult to achieve because known systems are usually overdetermined geometrically.

The object on which the present invention is based is to provide a centering device of the type initially mentioned, geometric over determination being ruled out and a functionally reliable and repeatedly accurate arrangement of the chuck on, for example, a rotating spindle being made possible.

The centering device according to the invention is consequently distinguished in that a conical portion matching with a chuck-side counterconical portion is provided on the securing portion, in such a way that the conical portion and/or the counterconical portion are/is designed to be elastically flexible in the axial direction. As, such after the conical portion comes to bear against the counterconical portion, the chuck can be displaced at least to some extent further on in the axial direction on account of axial force, until the chuck comes to bear against an, in particular, securing portion-side stop. What is crucial is that, when the chuck and the securing portion are moved toward one another, the conical portion comes into contact with the counterconical portion before the chuck comes to bear against the securing portion. On account of the flexibility of the conical portion and/or counterconical portion, this can yield in the axial direction during the locking of the chuck, with the result that defined and complete bearing of the chuck against the stop of the securing portion or rotating spindle can be achieved, without geometric overdetermination occurring. In particular, the chuck can come to bear over a large area against the corresponding stop.

The invention may be used in conjunction with chucks of rotary or stationary systems.

The securing portion may be formed directly by a component or subassembly, such as, in particular, a rotating spindle, or by a securing device capable of being arranged on the component or rotating spindle.

Advantageously, the conical portion and/or the counterconical portion are/is formed by wall portions of ring-like design which run parallel to one another. The wall portions preferably lie in planes running essentially transversely to the joining direction. The wall portions may be connected in one piece to the respectively associated component. In particular, they may be implemented by indentations.

Advantageously, the ratio of the spacing of the wall portions to their radial extent is lower than one and preferably in the range of 1:2 to 1:8 and preferably in the range of 1:3 to 1:5.

On account of this ratio, qualified elastic flexibility of the conical portion and/or counterconical portion can be achieved. Particularly when the portions are made from metallic material. It was shown that elastic flexibility in the range of $1/100$ mm to $1/10$ mm is sufficient to rule out overdetermination.

Furthermore, it may be advantageous if the top side and underside of a wall portion in each case are designed in cross section to run in a wedge-shaped manner with respect to the longitudinal mid-axis. The wedge shape has the advantage that, in the radially inner region of the wall portions, the wall portions have a smaller material thickness and the elastic flexibility thereby increases.

It is advantageous if in each case a wall portion forms a wedge angle in the range of 5° to 20° and preferably in the range of 8° to 12° and further preferably in the region of 10°. It was shown that these angular ranges lead to favorable elastic properties.

Additionally or alternatively, it is conceivable that the top side or underside of a wall portion in each case is arranged so as to run perpendicularly to the longitudinal mid-axis. This, too, gives rise to geometrically favorable conditions leading to good elastic deformability of the wall portions.

According to a further design of the invention, it is conceivable that the conical portion or the counterconical portion is formed by lamellae which lie one on the other in parallel and the radially outer free end faces of which are provided for coming to bear against the counterconical portion or conical portion. Since the lamellae lie one on the other, in the locking position they are flexibly deformed elastically as far as possible in parallel. On account of the comparatively small thickness of the lamellae, elastic flexibility in the axial direction is ensured, while very high rigidity is afforded in the radial direction. Thus, high radial rigidity and favorable axial flexibility, can thereby be advantageously achieved.

In an arrangement of lamellae, in order to obtain the cone-like surface area it is necessary for the outside diameter of the lower or upper lamella to be smaller than that of the upper or lower lamella. The lamellae lying between the uppermost and lowermost lamella then have outside diameters which ascend or descend slightly, so as to give rise, overall, to a conical surface area. It is conceivable that the outer free end faces of the lamellae are remachined in order to obtain an exactly conical surface area.

The individual lamellae preferably have a thickness in the range of 0.1 mm to 1.5 mm and, in particular, in the range of 0.3 mm to 0.7 mm and further, in particular, about 0.5 mm.

Furthermore, the number of lamellae provided lies, in particular, in the range of 5 to 20, preferably in the range of 8 to 15 and further preferably in the range of 10 to 12.

The lamellae are preferably of a ring-like design and have a central hole into which a bolt for holding the lamellae engages. The individual lamellae then each have different diameters, each of the diameters decreasing or increasing in the direction of the cone.

The object initially mentioned is also achieved by means of a locking device for locking a chuck on a securing portion, in particular, of a rotating spindle of a machine which has a centering device according to the invention, the securing portion having a locking means which, in a locking position, act upon the chuck with an axially acting draw-in force against the securing portion.

This ensures that, when the chuck is being locked on the rotating spindle, a suitable force is provided which acts upon the chuck in the axial direction against a component or the rotating spindle. Consequently, during centering, the conical portion and/or counterconical portion are/is deformed elastically in the axial direction, so that the chuck can come to bear against the securing portion-side stop.

The locking means provided may be, in particular, chucking slides which are motionally coupled to one another via a rotary member in such a way that, when the rotary member is rotated, the chucking slides change their radial position and can be displaced into a radially outer or radially inner locking position for locking the chuck on the securing portion. The advantage is that the plurality of chucking slides can be moved appropriately by actuating one member, to be precise the rotary member.

Furthermore, it is advantageous if the securing portion has a chuck reception portion and the chuck has a chucking portion for introduction into the chuck reception portion, the locking means and/or the chucking portion having slopes in such a way that, when the locking means are displaced into the locking position, the chuck is acted upon against the securing portion. Consequently, the displacement of the locking means provides the force. The chucking portion may be designed, in particular, as a chucking ring and the chuck reception portion as a chuck reception ring.

To rotate the rotary member, a control means may be provided which is motionally coupled to the rotary member, can be displaced tangentially with respect to the rotary member and is actuated via an adjusting screw. The arrangement of the control means and adjusting screw is such that, when the adjusting screw is rotated, the control means is moved tangentially relative to the to the rotary member. On account of the motional coupling of the control means to the rotary member, the rotary member is then rotated about its longitudinal mid-axis. Consequently, the chucking portions can be displaced synchronously with one another by actuating the adjusting screw.

For the motional coupling of the rotary member to the chucking slides, it is conceivable that the rotary member includes control curves or control cams, and that the chucking slides have control cams or control curves matching with the control curves or control cams. The control curves may be arranged, in particular, obliquely to a line running radially. For biasing purposes, these may also be arranged so as to run in a curved manner.

Further details and advantages may be gathered from the following description, by means of which various exemplary embodiments of the invention are described and explained in more detail. In the drawing.

Figure 3:
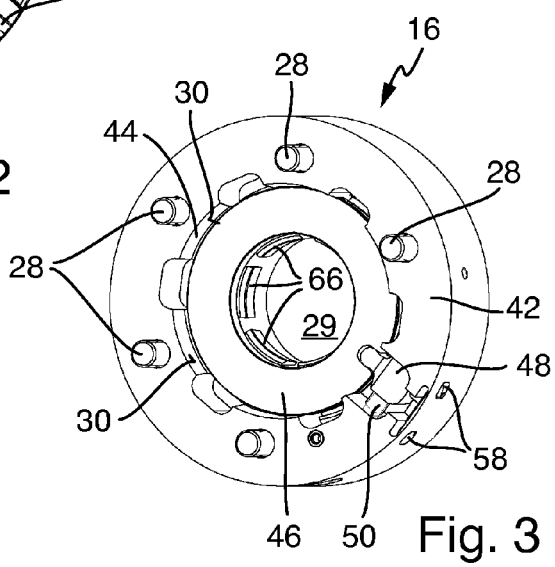
FIG. 3 shows the securing portion shown in FIG. 1 as a subassembly.
Figure 4A:
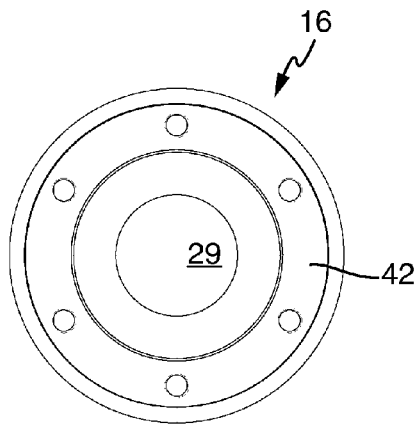
Figure 5A:
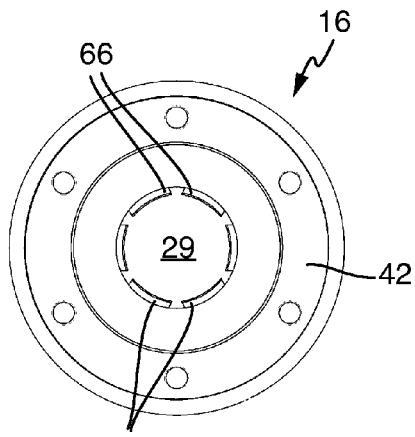
Figure 6:
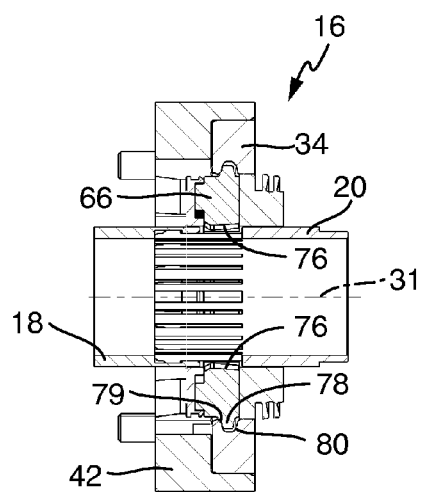
Figure 8A:
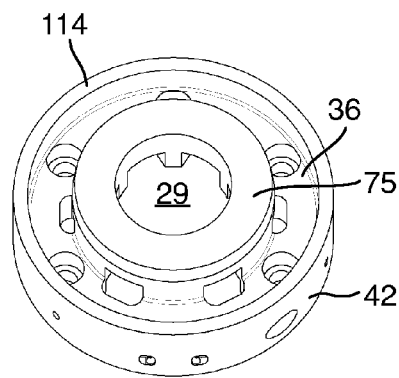
Figure 7:
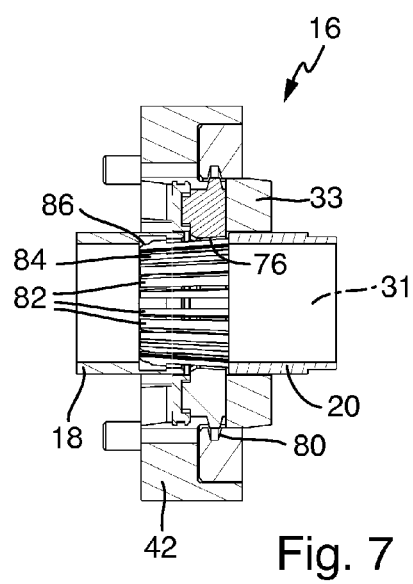
Figures 15A, 15B:
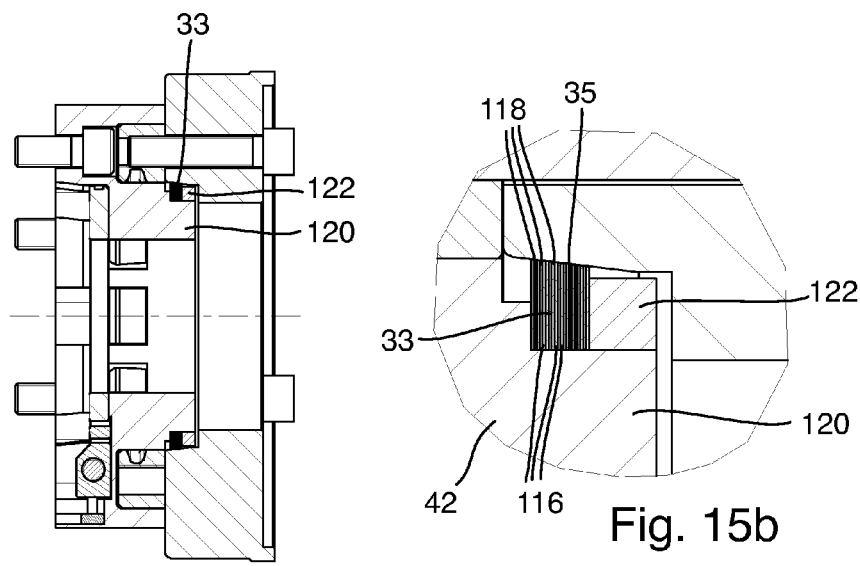
Figures 16A, 16B:
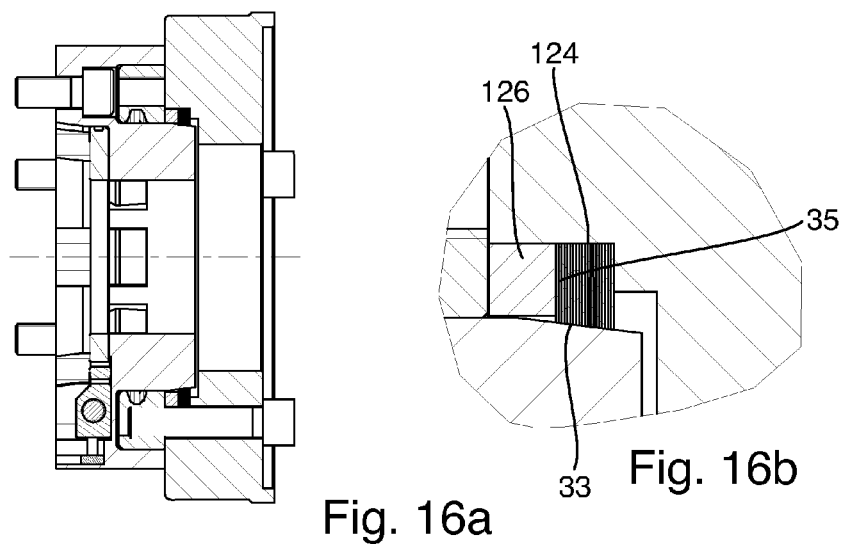

FIGS. 4a, b, c show various views of the securing portion according to FIG. 3 in a locking position;

FIGS. 5a, b, c show various views of the securing portion according to FIG. 3 in a release position;

FIG. 6 shows a section through the securing portion according to FIG. 3 with a tension tube and tension adapter;

FIG. 7 shows a section corresponding to FIG. 6 in the release position;

FIGS. 8a, b, c show various views of a basic body of the securing portion;

FIGS. 9a and b show various views of a rotary member of the securing portion;

FIG. 10 shows various views of a chucking slide of the securing portion;

FIGS. 11a and b show various views of a tension adaptor of the securing portion;

FIG. 12 shows various views of a chucking ring of the rotating spindle;

FIG. 13a shows a section corresponding to FIG. 6 without a tension tube and tension adaptor, but with a chuck body receptacle;

FIG. 13b shows an enlarged detail from FIG. 13a;

FIG. 14a shows a section corresponding to FIG. 13a through another embodiment;

FIG. 14b shows an enlarged detail from FIG. 14a;

FIG. 15a shows a section corresponding to FIG. 13a through a further embodiment;

FIG. 15b shows an enlarged detail from FIG. 15a;

FIG. 16a shows a section corresponding to FIG. 13a through a further embodiment; and FIG. 16b shows an enlarged detail from FIG. 16a.

Figure 1:
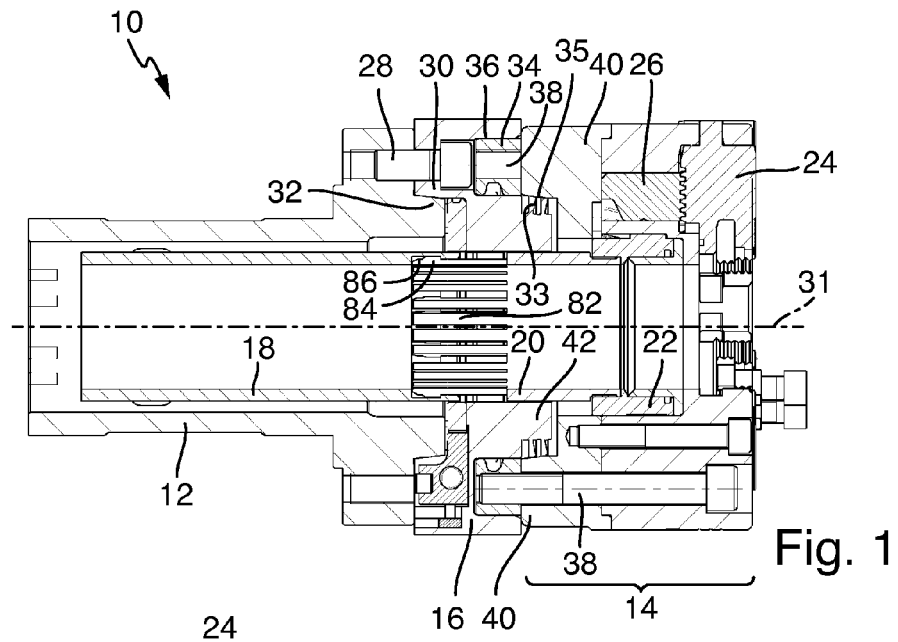
FIG. 1 shows a longitudinal section through a locking device with a securing portion.
Figure 2:
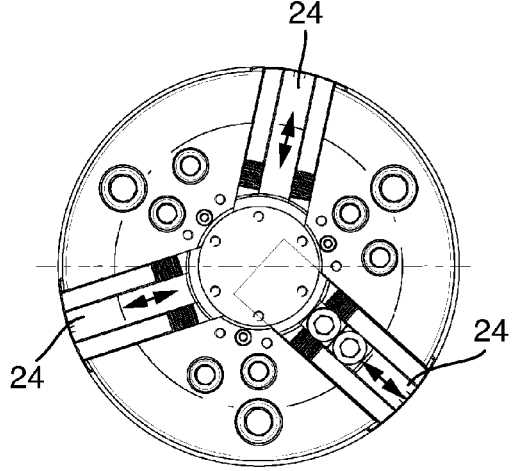
FIG. 2 shows a front view of the securing portion according to FIG. 1 toward the chuck.

FIG. 1 shows a locking device 10, which may also be designated as a securing system, which includes a machine-side rotating spindle 12, a chuck 14 and a securing portion in the form of a securing device 16, by means of which the chuck 14 is secured on the rotating spindle 12. Furthermore, a machine-side tension tube 18 is provided, which actuates a chucking piston 22 in the axial direction via a chuck-side tension adaptor 20. The chucking piston 22 is motionally coupled to chuck jaws 24 which overall can be moved toward one another and away from one another and which can be seen clearly in the view according to FIG. 2. Motional coupling is such that axial displacement of the chucking piston 22 via mechanical actuators 26 causes a radial movement of the chuck jaws 24 toward one another or away from one another. The chuck 14 or its chuck jaws 24 can consequently be power-operated via an axial movement of the tension tube 18.

The securing device 16 has in the middle region a central perforation 29. The longitudinal mid-axis is identified by reference symbol 31.

As becomes clear from FIG. 1, the securing device 16 is secured onto the rotating spindle 12 via securing screws 28. To center the securing device 16, the latter has an inner surface 30 which cooperates with a spindle-side outer surface 32. To center the chuck 14 on the securing device 16, the securing device 16 has a conical portion 33 which cooperates with a chuck-side counterconical portion 35. The conical portion 33 and the counterconical portion 35 form a centering device 100.

The chuck 14 has, on its side facing the securing device 16, a chucking ring 34 which is received within a chuck reception portion 36 of ring-like design. As likewise becomes clear from FIG. 1, the chucking ring 34 is screwed to a chuck receptacle 40 by means of securing screws 38.

The securing device 16 is illustrated as a separate subassembly in FIG. 3. It can be seen here that the securing device 16 has a basic body 42 which receives the securing screws 28. Furthermore, the inner surface 30 is likewise formed by the basic body.

Figure 4B:
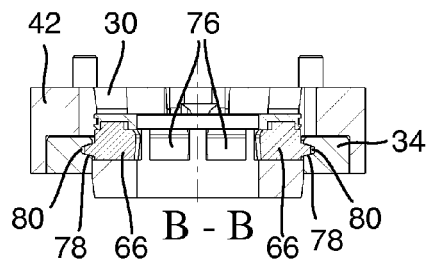
Figure 5B:
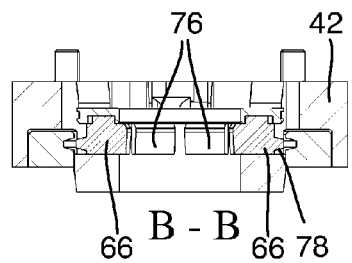
Figure 4C:
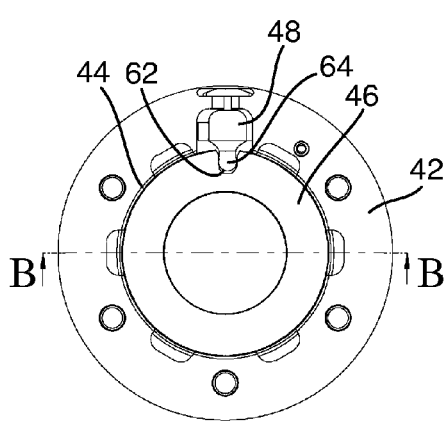
Figure 5C:
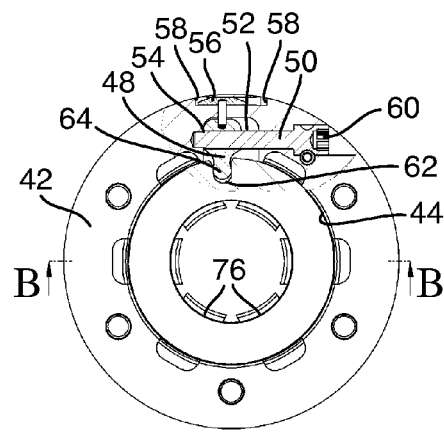

As becomes clear particularly from FIGS. 3, 4 and 5, the basic body 42 has, on its side facing the rotating spindle 12, an annular receptacle 44 in which a rotary member 46 in the form of a rotary ring is arranged so as to be rotatably mounted. To rotate the rotary member 46, a control means motionally coupled to the rotary member 46 and taking the form of a control piston 48 is provided. As becomes clear particularly from FIG. 5c, the control piston 48 can be displaced in the tangential direction along an adjusting screw 50. The adjusting screw 50 has a spindle thread 52 which cooperates with an internal thread 54 of the control piston 48 in such a way that, when the adjusting screw 50 is rotated, the control piston 48 is moved in the longitudinal direction of the adjusting screw 50. To indicate the position of the control piston 48, the control piston 48 has provided on it a sight slide 56, the position of which can be detected visually through viewing windows 58 provided on the basic body 42.

The adjusting screw 50 has at its accessible end an actuating portion 60, into which an, in particular, manually rotatable screw driver can be introduced for the purpose of rotating the adjusting screw 50. For the motional coupling of the control piston 48 to the rotary member 46, the rotary member 46 has a cam clearance 62 into which the control piston-side cam 64 engages.

The rotary member 46 is motionally coupled to locking means in the form of chucking slides 66 in such a way that, when the rotary member 46 is rotated, the chucking slides 66 change their radial position and can be transferred from a radially outer locking position into a radially inner release position. The radially outer locking position of the chucking slides 66 is shown in FIGS. 4a, 4b and 4c. The radially inner release position of the chucking slides 66 is shown in FIGS. 5a, 5b and 5c.

For the motional coupling of the rotary member 46 to the chucking slides 66, the rotary member 46 has on its top side facing the chucking slides 66 recesses in the form of control curves 68. These control curves 68 can be seen clearly in FIGS. 9a and 9b which show the rotary member 46 as an individual part. The control curves 68 have in each case slightly a curved axis 70 which is such that the rotary member 46 is biased in the radially outer locking position. Each of the chucking slides 66, which are illustrated in FIG. 10 as an individual part, have, on the side facing the rotary member 46, a control cam 72 which cooperates with one of the control curves 68. The chucking slides 66 are mounted in guide grooves 74 in the basic body 42 such that the chucking slides 66 are displaceable in the radial direction of the basic body 42. This becomes clear particularly from FIG. 8c where the guide grooves 74 for the respective chucking slides 66 can be seen clearly.

Figure 8B:
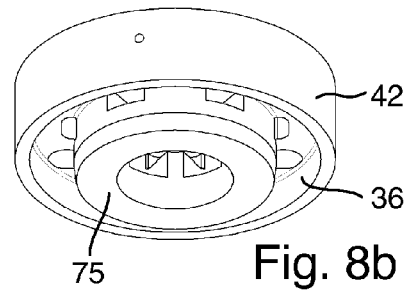
Figure 8C:
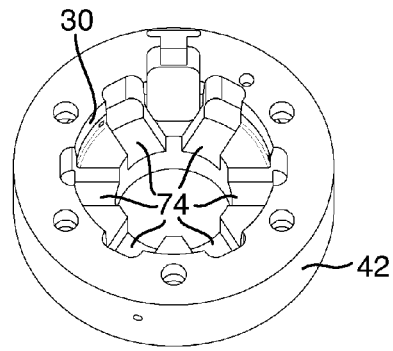

As becomes clear from FIG. 8, the basic body 42 has an inner continuous annular wall 75 which defines the central perforation 29 on the radially inner side and the ring-like chuck reception portion 36 on the radially outer side. The guide grooves 74 extend through the annular wall 75, so that, depending on position, the chucking slides 66 either engage into the region of the central perforation 29 (release position) or into the chuck reception portion 36 (locking position).

The chucking slides 66 have a radially inner portion 76 and a radially outer portion 78. As becomes clear from FIG. 4b, the radially outer portion 78 of v-shaped design in cross section has draw-in slopes 79 and, in the locking position, engages into a continuous annular groove 80 which is provided on the chucking ring 34 and which likewise has a v-shaped cross section. The annular groove 80 can be seen clearly particularly in FIGS. 12a and 12b in which the chucking ring 34 is illustrated as an individual part. On account of slopes 79, when the chucking slides 66 are being displaced into the radially outer locking position the chuck 14 is acted upon against the securing device 16. Reliable locking of the chucking ring 36 in the locking position on the securing device 16 is thereby achieved.

As becomes clear from FIG. 5b in which the chucking slides 66 are in the radially inner release position, the portions 78 are disengaged from the annular groove 80, so that the chuck 14 together with the chucking ring 34 can be removed from the securing device 16.

In the installed state of the securing device 16, the basic body 42 surrounds the tension adaptor 20, as becomes clear from FIG. 1. In FIG. 1, a sectional plane is selected in which the chucking slides do not lie and therefore are also not illustrated.

FIGS. 6 and 7 illustrate the securing device 16 as an individual part with a portion of the tension tube 18 and of the tension adaptor 20 in a section in which the chucking slides 66 can be seen. FIG. 6 shows the locking position; the chuck-side chucking ring 34 is held, locked on the securing device 16, via the chucking slides 66. As becomes clear from FIG. 6, FIG. 7 and also FIG. 11 which shows the tension adaptor 20 as an individual part, the tension adaptor 20 has on the side facing the tension tube 18 coupling portions 82 in the form of tongue portions which are formed in one piece with the tension adaptor 20 and are elastically flexible in the radial direction. The tongue portions extend in the axial direction and are elastically flexible in the radial direction. The tongue portions have, in the region of their free end, noses 84 which point radially outward. As can be seen clearly in FIG. 1 and FIG. 6, these noses 84 engage into a tension tube-side counterportion 86 which is designed as a continuous groove. The tongue portions arranged on the tension adaptor 20 in such a way that, in the radially inner release position of the chucking slides 66, they are elastically deformed radially inward, as becomes clear from FIG. 7. Deformation is such that the noses 84 are disengaged from the counterportions 86 and the tension adaptor 20 together with the chuck 14 can then be removed in the axial direction. The chucking slides 66 consequently have a double function; on the one hand, their portions 78 are disengaged from the chucking ring 34 and, on the other hand, they actuate the tongue portions 82 so that their noses 84 are disengaged from the counterportions 86. The chuck 14 can then be removed.

In the exemplary embodiment illustrated in the figures, the coupling portion including the tongue portions 82 is arranged on the tension adaptor 20 and the counterportion 86 is arranged on the tension tube 18. According to the invention, the coupling portion may also be provided on the tension tube 18 and the counterportion 86 on the tension adaptor 20. The arrangement is then such that the chucking slides 66 actuate the tension tube-side coupling portions in order to make it possible to remove the chuck together with the tension adaptor 20.

The described securing device 16 or the entire locking device 10 has the advantage that the chuck 14 can be exchanged simply by adjusting one screw, to be precise the adjusting screw 50. By the adjusting screw 50 being adjusted, on the one hand, the lock between the chucking slides 66 and the chucking ring 34 is released and, on the other hand, the coupling of the tension tube 18 to the tension adaptor 20 is also released.

The section shown in FIG. 13a corresponds essentially to the section according to FIG. 6, the tension tube and the tension adaptor not being illustrated in FIG. 13a. Contrary to FIG. 6, FIG. 13a illustrates the chuck-side chuck receptacle 40 to which the chucking ring 34 is secured.

It becomes clear from FIGS. 13a and 13b that the locking device 10 has a centering device 100 which comprises the conical portion 33 on the securing device side and the counterconical conical portion 35 on the chuck side.

As becomes clear particularly from FIG. 6 and FIGS. 13a and 13b, the conical portion 33 is formed by wall portions 102 running essentially parallel to one another. Overall, in the embodiment shown in FIG. 13, two wall portions are provided which run around in a ring-like manner. The wall portions 102 are formed in one piece with the basic body 42. The wall portions 102 can be implemented by the introduction of indentations 104 into the basic body 42. As becomes clear particularly from FIG. 13b, the wall portions 102 have in each case a top side 106 and an underside 108. The top side may run parallel to the underside. However, it becomes clear from FIG. 13b that the top side 106 and the underside 108 are designed to run, in cross section, in wedge-shaped manner with respect to the longitudinal mid-axis. The top side 106 and the underside 108 form a wedge angle α in the region of 10°. The underside 108 runs essentially perpendicularly to the longitudinal mid-axis 31. The top side 106 is inclined correspondingly. According to the invention, it is also conceivable that the top side 106 runs perpendicularly to the longitudinal mid-axis and the underside 108 is inclined correspondingly. It is likewise conceivable that both sides run at a corresponding inclination to the longitudinal mid-axis 31. The radially outer surface areas 110 of the wall portions 102 lie in a conical curved plane. The wall portions 102 merge into the basic body 42 in the foot region 112.

The chuck 14 or its chuck receptacle 40 has the counterconical portion 35 which is designed to match the conical portion 33. The design is such that, when the chuck 14 and the securing device 16 are moved axially toward one another, first the surface areas 110 of the wall portions 102 come to bear against the counterconical portion 35. After the surface areas 110 bear against the counterconical portion 35, the chuck 14 can then be moved further on in the axial direction until the chuck 14 or its chuck receptacle 40 comes to bear against the securing device 16 or its basic body 42. For this purpose, the securing device 16 or its basic body 42 provides a stop 114. The stop 114 is formed by that end face of the basic body 42 which faces the chuck 14 and which is configured in a ring-like manner. This stop 114 can be seen clearly particularly from FIG. 8a.

As explained initially, the force with which the chuck 14 is acted upon in the axial direction against the securing device 16 is provided via the displacement of the chucking slides 66 into their locking position.

On account of the elastic flexibility of the conical portion 33 or its wall portions 102 in the axial direction, defined bearing of the chuck 14 against the stop 114 of the securing device 116 can be ensured. In addition, functionally reliable centering can take place.

In the embodiment shown in FIGS. 14a and 14b, it is not the conical portion 33, but the counterconical portion 35 which has wall portions 102 that run parallel to one another and are correspondingly flexible in the axial direction. In contrast to this, the conical portion 33 has a closed surface. On account of the wall portions 102, which can be seen clearly in FIG. 14b, what is also achieved here is that, after the conical portion 33 has comes to bear against the counterconical portion 35, because of the axial draw-in force the chuck can be displaced at least to some extent further on in the axial direction until the chuck 14 comes to bear against the stop 114.

As becomes clear particularly from FIG. 13b and FIG. 14b, the ratio of the spacings a of the individual wall portions 102 from one another to their radial extent b is in the range of 1:2 to 1:5. This affords advantageous elastic properties of the wall portions 102.

In the embodiment according to FIG. 15, the conical portion 33 is formed by lamellae 116 lying one on the other in parallel. The radially outer free end faces 118 of the lamellae serve for bearing against the counterconical portion 35. The individual lamellae 116 are formed by annular disks which are placed onto a bolt portion 120 of the basic body 42 and which are held on the basic body 42 via a securing nut 122. The individual lamellae 116 have a central hole into which the bolt portion 120 engages. The outside diameter of the individual lamellae 116 decreases slightly axially from inside axially outward so as to form an overall conical surface area. In order to obtain an exactly conical surface area, it is conceivable that the surface area of the lamellae 116 arranged on the basic body 42 is remachined.

In FIG. 16, contrary to FIG. 15, the lamellae 116 are not provided on the conical portion 33, but instead on the counterconical portion 35. The lamellae 116 are likewise designed as annular disks, the conical surface area being formed here by the radially inner end faces of the lamellae 116. For this purpose, the lamellae 116 are inserted into a clearance 124 provided on the chuck body and are secured there by means of a securing ring 126.

As becomes clear from FIGS. 15 and 16, the lamellae 116 have a thickness of about 0.5 mm to 1 mm. Overall, around fifteen lamellae 116 lying one on the other are provided. The lamellae 116 afford the advantage that they are comparatively dimensionally stable under the action of forces in the radial direction. The lamellae 116 are comparatively flexurally soft under the action of forces in the axial direction. Consequently, after the counterconical portion 35 or the conical portion 33 has come to bear against the corresponding end faces of the lamellae 116, these are elastically deformed in the axial direction until the chuck 14 or the chuck receptacle 40 comes to bear against the stop 114.

The invention claimed is:

1. A locking device for locking a chuck on a securing portion of a rotating spindle of a machine, wherein the securing portion comprises a centering device for centering a chuck on the securing portion, wherein the securing portion has provided on it locking means which, in a locking position, act upon the chuck with an axially acting draw-in force against the securing portion, wherein a conical portion matching with a chuck-side counterconical portion is provided on a radially outer periphery of the securing portion in such a way that the conical portion and/or the counterconical portion are/is designed to be elastically flexible in the axial direction such that, after the conical portion comes to bear against the counterconical portion, the chuck can be displaced at least to some extent further on in the axial direction on account of axial force, until the chuck comes to bear against a defined stop.

2. The locking device as claimed in claim 1, wherein the conical portion and/or the counterconical portion are/is formed by wall portions of ring-like design which run parallel to one another.

3. The locking device as claimed in claim 2, wherein the ratio of the spacing of the wall portions to their radial extent is lower than one.

4. The locking device as claimed in claim 3, wherein the ratio of the spacing of the wall portions to their radial extent is in the range of 1:2 to 1:8.

5. The locking device as claimed in claim 4, wherein the ratio of the spacing of the wall portions to their radial extent is in the range of 1:3 to 1:5.

6. The locking device as claimed in claim 2, wherein a top side and underside of the wall portion in each case are designed in cross section to run in a wedge-shaped manner with respect to the longitudinal mid-axis.

7. The locking device as claimed in claim 2, wherein a top side and underside of the wall portion in each case form a wedge angle in the range of 5° to 20°.

8. The locking device as claimed in claim 7, wherein the top side and underside of the wall portion in each case form a wedge angle in the range of 8° to 12°.

9. The locking device as claimed in claim 8, wherein the top side and underside of the wall portion in each case form a wedge angle of 10°.

10. The locking device as claimed in claim 2, wherein a top side or underside of the wall portion in each case is arranged so as to run perpendicularly to the longitudinal mid-axis.

11. The locking device as claimed in claim 1, wherein the conical portion or the counterconical portion is formed by lamellae which lie one on the other in parallel and free end faces of which are provided for coming to bear against the counterconical portion or conical portion.

12. The locking device as claimed in claim 11, wherein the individual lamellae amount to a thickness in the range of 0.1 to 1 mm.

13. The locking device as claimed in claim 12, wherein the individual lamellae amount to a thickness in the range of 0.3 to 0.7 mm.

14. The locking device as claimed in claim 13, wherein the individual lamellae amount to a thickness of 0.5 mm.

15. The locking device as claimed in claim 11, wherein the number of lamellae provided lies in the range of 5 to 20.

16. The locking device as claimed in claim 11, wherein the lamellae are in each case of ring-like design and have a central hole.

17. The locking device as claimed in claim 1, wherein the locking means are designed as chucking slides which are motionally coupled to one another via a rotary member in such a way that, when the rotary member is rotated, the chucking slides change their radial position and can be displaced into a radially outer or radially inner locking position for locking the chuck on the securing portion.

18. The locking device as claimed in claim 17, wherein, to rotate the rotary member, a control means is provided which is motionally coupled to the rotary member, can be displaced tangentially with respect to the rotary member and can be actuated via an adjusting screw.

19. The locking device as claimed in claim 17, wherein the rotary member comprises control curves or control cams, and in that the locking means have control cams or control curves matching with the control curves or control cams.

20. The locking device as claimed in claim 1, wherein the securing portion has a chuck reception portion and the chuck has a chucking portion for introduction into the chuck reception portion, the locking means and/or the chucking portion having drawn-in slopes in such a way that, when the locking means are displaced into the locking position, the chuck is acted upon against the securing portion.

* * * * *